Patented Dec. 17, 1935

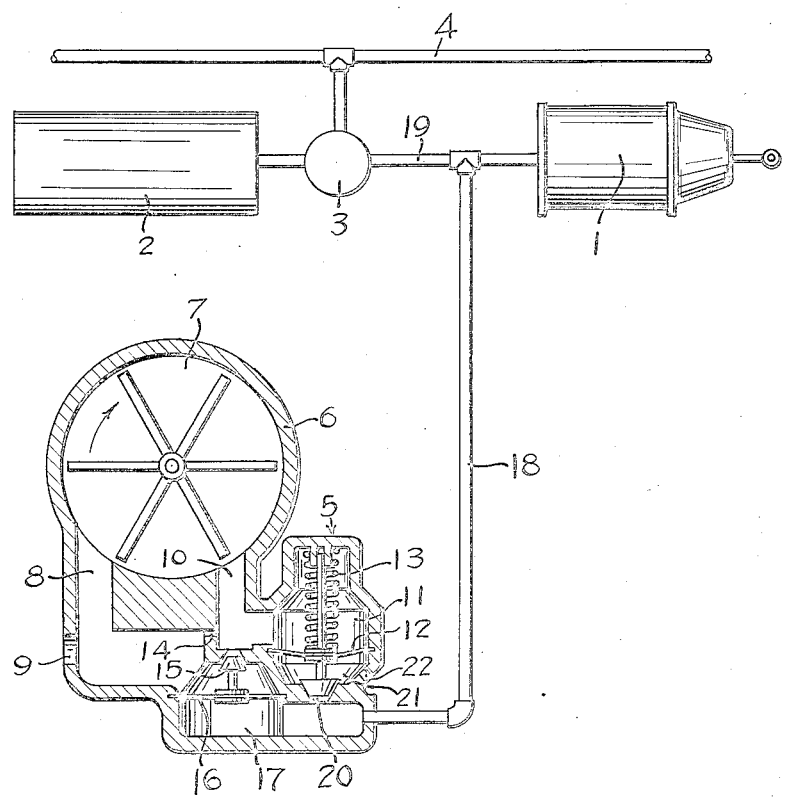

2,024,672

UNITED STATES PATENT OFFICE 2,024,672

SPEED CONTROLLED BRAKE

Ernest Wagner, Paris, France, assignor to The Westinghouse Air Brake Company, Wilmerding, Pa., a corporation of Pennsylvania Application June 22, 1934, Serial No. 731,844
In Great Britain September 1, 1933

5 Claims. (Cl. 303—21)

This invention relates to fluid pressure braking apparatus for railway or other vehicles of the kind comprising a valve for directly or indirectly controlling the pressure conditions obtaining in the brake cylinder or cylinders of the apparatus, and has for its object to provide arrangements for imposing a further control upon the braking action thus obtained in accordance with the speed of the vehicle upon which the apparatus is mounted, for the purpose of ensuring maximum braking efficiency so as to bring the vehicle to rest in the shortest possible time.

According to the principal feature of the invention the pressure obtaining in the brake cylinder or cylinders during an application of the brakes is arranged to be modified in order to effect the further control above referred to by means of a valve device the operation of which is automatically controlled in accordance with the speed of the vehicle or train by the action of a pump or compressor adapted to deliver a compressible or incompressible fluid to a chamber associated with the valve device in such a manner as to effect the control of the braking action throughout its entire range.

In one form of the invention the valve device is adapted to control direct communication between the brake cylinder and the atmosphere, the operation of the valve device being controlled by the pressure obtaining in the brake cylinder and by the action of the pump or compressor above referred to.

The invention is illustrated by way of example in the accompanying drawing as applied to fluid pressure braking apparatus comprising a triple or other form of distributing valve adapted to control the supply of fluid under pressure to and its release from the brake cylinder of the apparatus in response to variations in brake pipe pressure.

Referring now to the drawing it will be seen that the braking apparatus is shown as comprising a brake cylinder 1, an auxiliary reservoir 2 and a triple valve 3 which is operated in accordance with the pressure conditions in the brake pipe 4 to effect the supply of fluid from the reservoir 2 to the brake cylinder 1 or the release of fluid from the brake cylinder to the atmosphere in the usual well known manner.

A valve device 5 is provided embodying one form of the invention and controlling communication between the brake cylinder 1 and the atmosphere, the valve device 5 comprising a casing 6 the upper part of which contains a rotary pump 7 of the rotating vane or other suitable type driven from an axle of the vehicle. The inlet or suction passage 8 of the pump 7 is in open communication with the atmosphere through a port 9 so that the pump 7 during its rotation draws in atmospheric air through the port 9 which is supplied through the outlet or delivery passage 10 of the pump to a pressure chamber 11 arranged on the upper side of a flexible diaphragm 12 provided with a suitable controlling spring 13 arranged within the chamber 11 and acting upon the diaphragm 12. The pressure chamber 11 communicates through a restricted port 14 with the suction or inlet passage 8 of the pump 7 and thus with the atmosphere through the port 9, communication between the pressure chamber 11 and the passage 8 being also effected through a valve 15 hereinafter termed the braking valve operated by a second flexible diaphragm 16 subject on its upper side to atmospheric pressure and on its lower side to the pressure in a valve chamber 17 which communicates through a suitable pipe or passage 18 with the pipe or passage 19 leading from the triple valve 3 to the brake cylinder 1. The diaphragm 12 is arranged to operate a valve 20 hereinafter termed the release valve controlling communication between the valve chamber 17 and an exhaust chamber 21 arranged underneath the diaphragm 12 and communicating with the atmosphere through an exhaust port 22.

The operation of the valve device 5 is as follows:

So long as the brakes are released and atmospheric pressure obtains in the brake cylinder 1 the valve chamber 17 is also at atmospheric pressure and the braking valve 15 is maintained in its normal or open position as shown so that so long as the vehicle is running atmospheric air is drawn in through the port 9 and the inlet passage 8 of the pump 7, this air passing through the outlet passage 10 and pressure chamber 11 and thence through both the restricted port 14 and the open braking valve 15 to return to the atmosphere, with the result that the pressure in the pressure chamber 11 is atmospheric pressure and the release valve 20 is maintained in its closed position under the pressure of the controlling spring 13 acting on the upper side of the diaphragm 12.

Upon an application of the brakes being effected the pressure in the brake cylinder 1 established by the action of the triple valve 3 in the usual manner and transmitted to the valve chamber 17 through the pipe or passage 18 acts on the underside of the diaphragm 16 and moves the braking valve 15 to its closed position, with the result that communication between the inlet passage 8 and the outlet passage 9 of the pump 7 is effected only through the restricted port 14. Under these conditions the action of the pump 7 tends to build up pressure within the pressure chamber 11 owing to the escape of air therefrom being throttled at the restricted port 14, the pressure thus built up in the pressure chamber 11 being evidently proportional to the speed of rotation of the pump 7, that is to say, to the speed at which the vehicle is traveling.

This pressure obtaining in the pressure chamber 11 acting on the diaphragm 12 assists the action of the controlling spring 13 in maintaining the release valve 20 closed while the pressure in the valve chamber 17 acting on the underside of the release valve 20 tends to open this valve.

In the event, therefore, of the brake cylinder pressure acting in the valve chamber 17 exceeding the opposing pressure exerted by the controlling spring 13 and the pressure in the pressure chamber 11 the release valve 20 will be opened and will establish communication between the brake cylinder 1 and the atmosphere by way of the pipes or passages 19, 18, the valve chamber 17 past the release valve 20, the exhaust chamber 21 and the exhaust port 22.

It will thus be seen that the opening of the release valve 20 will depend upon the pressure built up in the pressure chamber 11 which is proportional to the speed of the vehicle and the opposing pressure in the valve chamber 17 which is dependent upon the brake cylinder pressure. When the vehicle is traveling at a high speed, therefore, and the brakes are applied the pressure built up in the pressure chamber 11 due to the operation of the pump 7 will be sufficient to maintain the release valve 20 closed until the opposing brake cylinder pressure has attained a relatively high value which is preferably arranged to be the maximum brake cylinder pressure available.

Assuming that this brake cylinder pressure is maintained through the operation of the triple valve and the speed of the vehicle is consequently reduced the pressure in the pressure chamber 11 will be reduced as the speed decreases by the escape of air through the restricted port 14, with the result that when the speed attains a predetermined reduced value the brake cylinder pressure acting in the valve chamber 17 will overcome the opposing pressures of the fluid in the pressure chamber 11 and of the controlling spring 13 and the release valve 20 will be opened to permit the release of fluid from the brake cylinder directly to the atmosphere through the port 22 thus reducing the braking action to a value corresponding to the reduced speed of the vehicle. As soon as the brake cylinder pressure is thus reduced the release valve 20 will be reclosed until the speed of the vehicle has fallen to a still lower value resulting in a corresponding reduction in the pressure in the pressure chamber 11, whereupon the release valve 20 will again be opened to permit a further release of fluid from the break cylinder 1.

It will thus be seen that as the speed of the vehicle is reduced by the braking action the brake cylinder pressure is automatically correspondingly reduced until for a suitable predetermined minimum speed of the vehicle the brake cylinder pressure is insufficient to open the release valve 20 against the opposing action of the controlling spring 13 and this valve is consequently maintained closed so that no further release of fluid from the brake cylinder through the valve device 5 occurs.

It will be understood that the pressure exerted by the controlling spring 13 is so determined that when the vehicle is at rest or moving at a relatively low speed the release valve 20 is maintained continuously closed until the brake cylinder pressure exceeds a corresponding relatively low value.

The invention is evidently not limited to the particular constructions and arrangements above described and illustrated by way of example, which may be varied in many respects without exceeding the scope of the invention.

Having now described my invention, what I claim as new and desire to secure by Letters Patent, is:

1. In a vehicle braking apparatus, the combination with a brake cylinder, of a pump driven according to the speed of the vehicle for compressing fluid into a chamber, a valve for controlling the release of fluid from the brake cylinder, a movable abutment subject to the pressure of fluid in said chamber for operating said valve, a relief valve past which fluid compressed by said pump can escape to prevent the building up of fluid pressure in said chamber, and a movable abutment operated upon a predetermined increase in brake cylinder pressure for closing said relief valve.

2. In a vehicle braking apparatus, the combination with a brake cylinder, of a pump driven according to the speed of the vehicle for compressing fluid into a chamber having a restricted port open to the atmosphere, a valve for controlling the release of fluid from the brake cylinder, a movable abutment subject to the pressure of fluid in said chamber for operating said valve, a relief valve past which fluid compressed by said pump can escape to prevent the building up of fluid pressure in said chamber, and a movable abutment operated upon a predetermined increase in brake cylinder pressure for closing said relief valve.

3. In a vehicle braking apparatus, the combination with a brake cylinder, of a pump driven according to the speed of the vehicle for compressing fluid into a chamber, a valve controlling the pressure of fluid supplied by said pump, a first movable abutment for controlling said valve, said abutment being subject to the pressure of the fluid in the brake cylinder, a second valve for controlling the pressure of the fluid in the brake cylinder, a second movable abutment for controlling said second valve, said second movable abutment being subject to the pressure of the fluid supplied by said pump.

4. In a vehicle braking apparatus, the combination with a brake cylinder, of a pump driven according to the speed of the vehicle for compressing fluid into a chamber, said pump being operable at all times that the vehicle is in motion, a valve controlling a passage leading from said pump and operable to control the pressure of the fluid supplied by said pump, said valve being normally open, means responsive to the pressure of the fluid in the brake cylinder and controlling said valve, said means being operable on an increase in the pressure of the fluid in the brake cylinder to close said valve, a second valve controlling a passage leading from the brake cylinder and operable to control the release of fluid from the brake cylinder, and means responsive to the pressure of fluid supplied by said compressor and operable to control said last-named valve.

5. In a vehicle braking apparatus, the combination with a brake cylinder, of a pump driven according to the speed of the vehicle for compressing fluid into a chamber, a valve controlling the pressure of fluid supplied by said pump, means responsive to the pressure of the fluid in the brake cylinder and operable to control said valve, a second valve for controlling the release of fluid from the brake cylinder, and means responsive to the pressure of fluid supplied by said pump and controlling said second valve.

ERNEST WAGNER.